US008889254B2

(12) United States Patent
Bayne et al.

(10) Patent No.: US 8,889,254 B2
(45) Date of Patent: Nov. 18, 2014

(54) IMPACT-DAMAGE-RESISTANT GLASS SHEET

(75) Inventors: John Frederick Bayne, Elmira, NY (US); James Joseph Price, Corning, NY (US); Daniel A. Sternquist, Horseheads, NY (US); Jaymin Amin, Corning, NY (US)

(73) Assignee: Corning Incorporated, Corning, NY (US)

( * ) Notice: Subject to any disclaimer, the term of this patent is extended or adjusted under 35 U.S.C. 154(b) by 616 days.

(21) Appl. No.: 12/986,424

(22) Filed: Jan. 7, 2011

(65) Prior Publication Data

US 2011/0165393 A1    Jul. 7, 2011

Related U.S. Application Data

(60) Provisional application No. 61/391,323, filed on Oct. 8, 2010, provisional application No. 61/293,032, filed on Jan. 7, 2010.

(51) Int. Cl.
*B32B 7/02* (2006.01)
*C03C 15/02* (2006.01)
*C03C 21/00* (2006.01)

(52) U.S. Cl.
CPC ............. *C03C 15/02* (2013.01); *C03C 21/002* (2013.01)
USPC ............................ 428/220; 428/336; 428/215

(58) Field of Classification Search
None
See application file for complete search history.

(56) References Cited

U.S. PATENT DOCUMENTS

| 3,779,732 | A | 12/1973 | Spanoudis |
| 4,911,743 | A | 3/1990 | Bagby |
| 5,468,346 | A | 11/1995 | Bruce et al. |
| 5,773,148 | A * | 6/1998 | Charrue et al. ............... 428/410 |
| 5,804,317 | A | 9/1998 | Charrue |
| 8,273,262 | B2 | 9/2012 | Saijo et al. |
| 8,652,979 | B2 | 2/2014 | Murata |
| 2009/0110914 | A1 | 4/2009 | Zhuang et al. |
| 2009/0197048 | A1* | 8/2009 | Amin et al. .................. 428/142 |
| 2009/0197088 | A1* | 8/2009 | Murata ........................ 428/410 |
| 2009/0202808 | A1 | 8/2009 | Glaesemann et al. |

(Continued)

FOREIGN PATENT DOCUMENTS

| CN | 1044448 A | 8/1990 |
| EP | 2202208 A1 | 6/2010 |

(Continued)

OTHER PUBLICATIONS

Chemical Abstracts, Chemical Abstracts Service (CAS) US, Dec. 16, 1991.

(Continued)

*Primary Examiner* — David Sample
*Assistant Examiner* — Nicole T Gugliotta
(74) *Attorney, Agent, or Firm* — John T. Haran

(57) ABSTRACT

Impact-damage-resistant glass sheet comprising at least one chemically etched surface in combination with a tempering surface compression layer, the glass sheet exhibiting a high standardized ball drop failure height and a high flexural modulus of rupture strength, useful to provide damage-resistant glass cover sheets for consumer electronic video display devices, is provided by subjecting thin glass sheet to a combination of a surface tempering treatment and a surface etching treatment that improves strength while maintaining the optical glass sheet properties required for video display applications.

14 Claims, 3 Drawing Sheets

(56) References Cited

U.S. PATENT DOCUMENTS

| | | |
|---|---|---|
| 2009/0325776 A1 | 12/2009 | Murata |
| 2010/0035038 A1* | 2/2010 | Barefoot et al. ............. 428/220 |
| 2010/0047521 A1* | 2/2010 | Amin et al. ................... 428/141 |
| 2012/0015197 A1 | 1/2012 | Sun et al. |

FOREIGN PATENT DOCUMENTS

| | | | |
|---|---|---|---|
| JP | 2000-154040 | * 6/2000 | ............. C03C 15/02 |
| JP | 2000-154040 A | 6/2000 | |
| JP | 2004091291 A | 3/2004 | |

OTHER PUBLICATIONS

EP Patent Abstract of JP 2004091291.

EP Patent Abstract of JP 2000154040.

B. Proctor; "The Effects of Hydrofluoric Acid Etching on the Strength of Glass"; Physics and Chemistry of Glasses; vol. 3, No. 1; Feb. 1962; pp. 7-27.

Chinese Notice of First Office Action & Search Report dated May 23, 2014 relating to CN Patent Application No. 201180005571.9.

\* cited by examiner

IMPACT-DAMAGE-RESISTANT GLASS SHEET

CROSS-REFERENCE TO RELATED APPLICATIONS

This application claims the benefit of priority under 35 U.S.C. §119(e) of U.S. Provisional Application Ser. No. 61/391,323 filed on Oct. 8, 2010, and also claims the benefit of priority under 35 U.S.C. §119(e) of U.S. Provisional Application Ser. No. 61/293,032 filed on Jan. 7, 2010.

BACKGROUND

1. Field of the Invention

The products and methods of the present disclosure relate generally to strengthened glass sheet and more particularly to glass sheet exhibiting high resistance to flexural strain and impact damage.

2. Technical Background

Cover glass sheet for consumer electronics devices including cell phones, PDAs, desktop, laptop and netbook computers, and LCD and plasma televisions is presently in high demand. The performance attributes of such sheet that are highly valued by designers, producers and end-users of these devices include low thickness, high surface strength and scratch resistance, and high resistance to flexural strain and impact damage.

Universally accepted methods for evaluating the resistance of cover glass sheet to impact damage such as cracking or shattering include standardized flexural (bending) strain and ball drop (impact) testing. Ball drop testing is quite demanding and can reveal wide ranges of impact damage resistance in even a single commercial cover glass sheet product line if close control over glass quality is not exercised. Thus tightly distributed ball drop failure performance results are as important as resistance to breakage at high ball drop heights.

Although ball drop testing is widely used for both system and component level testing, glass attributes that impact ball drop performance are complex. For example, increasing failure rates at higher ball drop heights and/or reduced cover glass sheet thicknesses or sheet strengths are generally expected and observed, but the variability in failure rates at a single ball drop height for glass sheet of common manufacturing origin, nominal thickness, and equivalent bending strength remains a major concern.

Moreover, glass strengthening methods that are highly effective to increase sheet glass resistance to ball drop impact breakage can still produce sheet exhibiting widely varying strengths under flexural tests designed to evaluate the bending modulus of rupture strengths of the glasses. For example, bi-axial or ring-on-ring flexural strength tests that are conducted on nominally identical glass samples pre-processed to improve impact damage resistance can produce widely varying flexural strength results.

SUMMARY

In accordance with the present disclosure the problem of surface strength variability in thin glass sheet is addressed though a chemical treatment of the glass surface that provides significantly improved bi-axial flexural strength and impact damage resistance. Thus consumer electronics devices incorporating thin cover sheets of the treated glass, particularly including the large-area cover sheets used for LCD and plasma television display screens but also extending to hand-held electronic devices, exhibit greatly increased and more consistent resistance to breakage from the impact and flexural stresses that can be encountered in use.

In a first aspect, therefore, the present disclosure provides impact-damage-resistant glass sheet comprising at least one tempered and chemically etched surface and exhibiting a standardized 128 g ball drop failure height of least 120 cm. To provide such performance the glass sheet incorporates a surface compression layer with a depth of at least 8 μm and a surface compressive stress level of at least 200 MPa.

In particular embodiments the present disclosure provides thin damage-resistant aluminosilicate glass sheet comprising at least one chemically etched, compressively-stressed surface, wherein the level of compressive stress at the surface is at least 400 MPa and the depth of the surface compression layer (DOL) is at least 15 μm.

In a still further embodiment, the present disclosure provides thin damage-resistant alkali aluminosilicate glass sheet comprising at least one chemically etched, compressively-stressed surface, wherein the level of compressive stress at the surface is at least 400 MPa and the depth of the surface compression layer (DOL) is at least 30 μm.

The chemically etched surface may be an acid-etched surface. In ball drop testing, thin acid-etched alkali aluminosilicate glass sheet with these characteristics is found to exhibit a standardized ball drop failure height of least 140 cm, or even at least 180 cm, with failure heights in the range of 300 cm being observed at higher levels of surface compression and depths of compression layer.

For the purposes of the present disclosure a thin glass sheet is a glass sheet having a thickness not exceeding 2 mm. By alkali aluminosilicate glass sheet is meant glass sheet composed of a glass consisting predominantly (more than 50% by weight in total) of silica and alumina that contains sufficient exchangeable alkali metal to develop a surface compressive stress in excess of 500 MPa by ion-exchange strengthening (chemical tempering) at temperatures below the strain point of the glass.

Particularly important embodiments of the presently disclosed damage-resistant glass sheet include alkali aluminosilicate glass sheet of a uniform thickness not exceeding 1.5 mm, or even 1.0 mm. For those embodiments the sheet surfaces will typically comprise a surface compression layer with a depth-of-layer (DOL) of at least about 30 μm, or even at least about 40 μm, with the level of compressive stress at the sheet surface within the surface compression layer being at least about 500 MPa, or even at least about 600 MPa.

In yet another aspect the present disclosure provides a video display device comprising a strengthened glass cover sheet, wherein the glass cover sheet has thickness in the range of 0.2-2 mm, an alkali aluminosilicate glass composition, and at least one surface compression layer incorporating a chemically etched surface. Included are embodiments wherein the surface compression layer incorporates an acid-etched surface and has a depth of at least 30 μm and a surface stress level of at least 500 MPa. Also included are embodiments wherein the surface compression layer incorporating the acid-etched surface is provided on at least the rear or non-exposed surface of the glass cover sheet.

In yet another aspect the present disclosure provides methods of making a strengthened glass sheet comprising the steps of (i) subjecting at least one surface of the glass sheet to a tempering treatment to develop a compressive surface layer thereon, and (ii) contacting the at least one surface of the glass sheet with a chemical etching medium such as an acidic etching medium to remove a glass surface layer of slight thickness therefrom. In particular embodiments of the disclosed methods the step of contacting the at least one surface of the glass sheet is for a time and at a temperature effective to remove not more than 4 μm of surface glass, or even not more than 2 μm of surface glass, from the sheet.

Particularly included within the scope of the disclosed methods are embodiments wherein the glass sheet is of alkali aluminosilicate composition, and wherein the glass sheet to be tempered and etched is pre-selected to have at least one surface substantially free of surface flaws of a depth greater than about 2 μm. For the case of alkali aluminosilicate glass starting sheets the tempering treatment can be selected from the group consisting of thermal tempering and chemical tempering, and the etching medium can be an aqueous medium comprising a fluoride compound.

BRIEF DESCRIPTION OF THE DRAWINGS

The products and methods of the present disclosure are further described below with reference to the appended drawings wherein.

DETAILED DESCRIPTION

Figure 1:
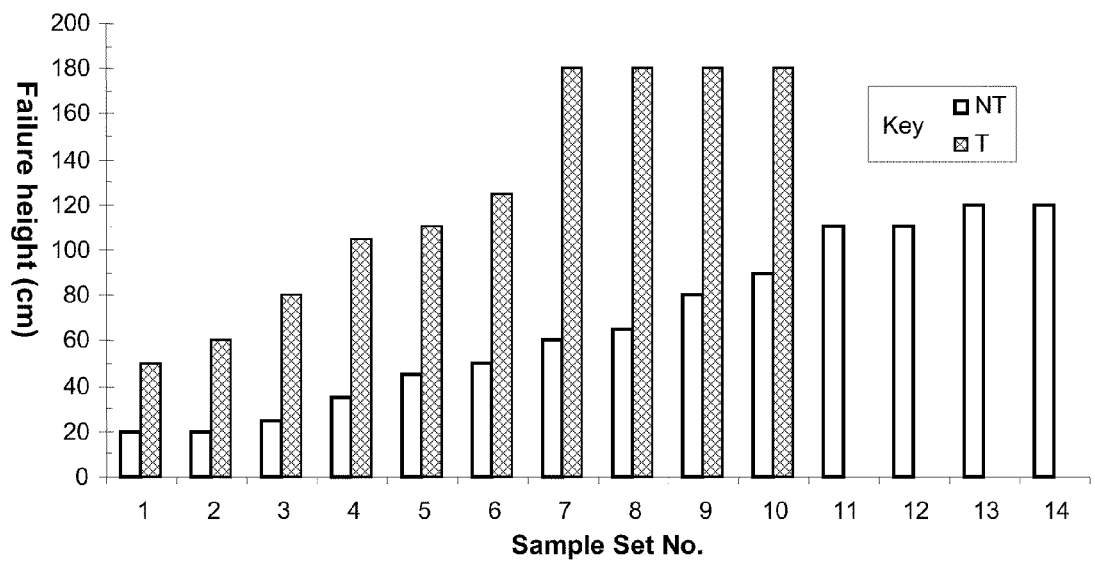
FIG. 1 is a graph presenting standardized ball drop test data for a first group of glass sheet samples.

While the methods and products provided in accordance with the present disclosure have application to a wide variety of products and product manufacturing processes, they may be applied with particular advantage to the manufacture of cover glass sheets for displays incorporated in consumer electronics devices. Accordingly, the particular examples and embodiments of those products and methods presented below may be set forth with specific reference to such cover glasses even though the use of disclosed methods and products is not limited thereto.

Ion-exchange-strengthened aluminosilicate glasses are used in a variety of display cover glass applications for consumer electronics where high surface strength and resistance to surface damage are demanded. Yet current ion-exchange-strengthened sheets of these glasses may display limited, or at least undesirably variable, resistance to impact damage and/or flexural stress failure. This is of particular concern in as the number and variety of consumer electronics devices increases and as the use environments for such devices become increasingly hostile.

The combined use of a chemical tempering (ion exchange) treatment along with a brief acid treatment of the surface of glass cover sheets has been found to substantially improve the impact damage resistance of thin aluminosilicate glass sheet as shown by higher and more consistent standardized ball drop test results. For the purpose of the present description the standardized ball drop test is one wherein a ball of a standard size and weight, i.e., a stainless steel ball of 31.75 mm diameter and 128 grams weight, is repeatedly dropped from increasing heights on a square glass sheet sample of 50×50 mm outer dimensions until breakage of the glass sheet sample occurs.

Conventional mechanical finishing procedures for improving the surface finish of thin tempered glass sheet can improve ball drop impact resistance in some cases. However no single mechanical approach can be applied with consistent effectiveness to a variety of glass compositions and/or a variety of glass shapes. Nor does mechanical finishing mitigate the randomizing effects of flaw shape and defect sizes and shapes on the impact resistance or flexural strength of the glass. The use of a chemical surface treatment comprising contacting one or both surfaces of a glass sheet with an acidic glass etching medium is relatively versatile, can be readily tailored to most glasses, and can readily applied to both planar and complex cover glass sheet geometries. Further, it is found to be effective to reduce strength variability even in glass having a low incidence of surface flaws, particularly including up-drawn or down-drawn (e.g., fusion-drawn) glass sheet that is conventionally thought to be largely free of surface flaws introduced during manufacture or during post-manufacturing processing.

The ball drop performance of glass cover sheet of slight thickness (≤2 mm thick) can exhibit particularly high levels of variability, with large differences in impact damage resistance being observed even within a given process lot of down-drawn sheet with smooth fused surfaces. For example, for a given set of test conditions, ball drop failure heights may range from a low of 20 cm to in excess of 120 cm, a variation as high as 6 times, within a single drawn sheet lot.

As these results indicate, improving the impact damage resistance of thin glass cover sheets will require raising the low end of the failure height distribution curve as well as reducing the overall variability of the results. Improvements in the average ball drop failure height of a product population are of little value if the population includes members exhibiting unacceptably low resistance to impact breakage. The chemical surface treatment methods disclosed herein are particularly effective in providing significant improvements across the entire breadth of impact strength results collected for any particular group of treated samples, without unacceptably reducing the strengthening effects of chemical tempering treatments.

Embodiments of the disclosed methods that include both chemical tempering (an ion exchange treatment step) and an acid etching step offer consistently large improvements in impact resistance when compared with glasses treated by chemical tempering alone. The acid treatment step is thought to provide a chemical polishing of the surface that may alter the size and/or geometry of surface flaws, which size and shape variables are thought to play an important role in ball drop performance but have a minimal effect on the general topography of that surface. In general, acid etching treatments effective to remove not more than about 4 nm of surface glass, or in some embodiments not more than 2 μm, or even not more than 1 μm, are employed for the disclosed purpose.

The acid removal of more than the prescribed thicknesses of surface glass from chemically tempered glass sheet is to be avoided for at least two reasons. First, excessive removal reduces both the thickness of the surface compression layer and the level of surface stress provided by that layer. Both effects are detrimental to the impact and flexural damage resistance of the sheet. Secondly, excessive etching of the glass surface can increase the level of surface haze in the glass to objectionable levels. For consumer electronics display applications, no visually detectable surface haze in the glass cover sheet for the display is permitted.

A variety of chemicals, concentrations, and treatment times may be used to achieve a selected level of ball drop impact test performance. Examples of chemicals useful for carrying out the acid treatment step including fluoride-containing aqueous treating media containing at least one active glass etching compound selected from the group consisting of HF, combinations of HF with one or more of HCL, $HNO_3$ and $H_2SO_4$, ammonium bifluoride, sodium bifluoride and others. As one particular example, an aqueous acidic solution consisting of 5 vol. % HF (48%) and 5 vol. % $H_2SO_4$ (98%) in water will significantly improve the ball drop performance of ion-exchange-strengthened alkali aluminosilicate glass sheet having a thickness in the range of 0.5-1.5 mm using treatment times as short as one minute in duration.

Best results with acidic etching media of $HF/H_2SO_4$ composition are obtained with drawn sheet previously strengthened using a chemical (ion-exchange) tempering treatment. Glass not subjected to ion-exchange strengthening or thermal tempering, whether before or after acid etching, may require different combinations of etching media to achieve large improvements in ball drop test results.

Maintaining adequate control over the thickness of the glass layer removed by etching in HF-containing solutions is facilitated if the concentrations of HF and dissolved glass constituents in the solutions are closely controlled. While periodic replacement of the entire etching bath to restore acceptable etching rates is effective for this purpose, bath replacement is expensive and the cost of effectively treating and disposing of depleted etching solutions is high.

In accordance with the present disclosure a method for continually refreshing an HF etching bath that contains an excessive amount of dissolved glass or an insufficient concentration of HF is provided. In accordance with that method a volume of the bath containing known concentrations of dissolved glass constituents and HF, wherein the HF concentration is below a predetermined minimum and/or the mass of dissolved glass is above a predetermined maximum, is removed from the bath. The removed volume is then replaced by an equivalent volume of an HF-containing solution containing HF in a concentration sufficient to restore the HF concentration of the bath to at least the predetermined minimum HF concentration. In typical embodiments the replacement solution will also be substantially free of dissolved glass constituents.

The disclosed method steps may be practiced in stepwise or in substantially continuous fashion, as dictated by the particular glass sheet finishing plan to be employed. However, if practiced in stepwise fashion, the steps of removal and replacement are carried out with a frequency sufficient to maintain the HF concentration at or above the predetermined minimum and the mass of dissolved glass constituents at or below a predetermined maximum. The minimum HF and maximum dissolved glass levels are predetermined from those levels found to unacceptably reduce surface glass dissolution rates by the bath. The concentrations of HF and dissolved glass in the bath at any selected time can be measured, or they can be calculated given knowledge of the etching conditions, dissolved glass compositions, and surface areas of the glass sheets being treated.

Figure 2:
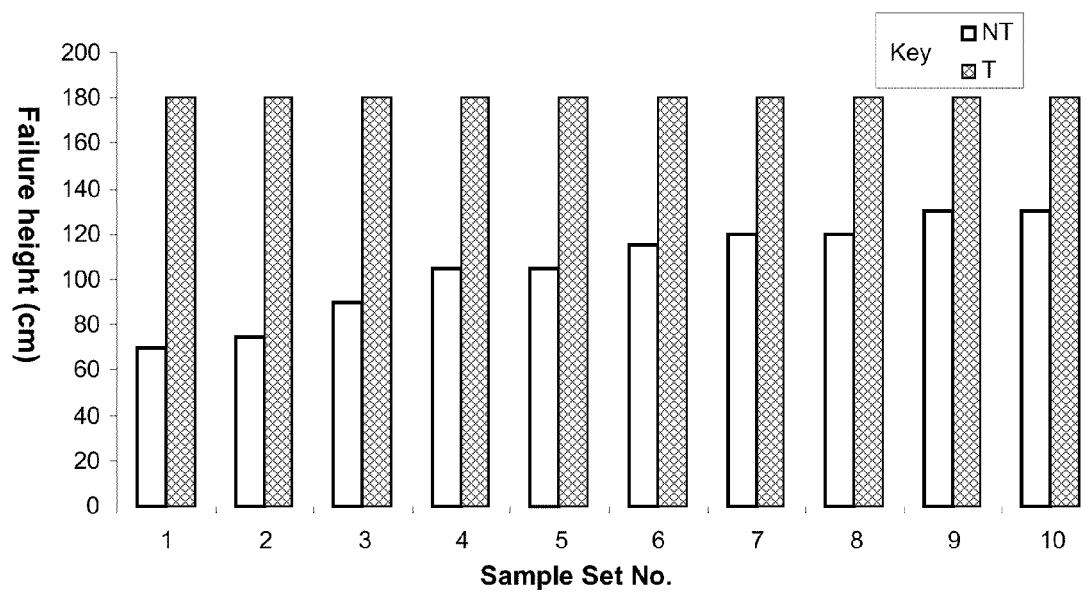
FIG. 2 is a second graph presenting standardized ball drop failure data for a second group of glass sheet samples.

The effectiveness of the above-described methods for improving the impact damage resistance of thin drawn alkali aluminosilicate glass sheet can be shown from ball drop test results conducted on treated glass sheets of commercially available glasses. FIGS. 1 and 2 of the drawings set forth bar graphs reporting ball drop test data for sheets of two such commercial glasses, i.e., Corning Code 2318 glass and Corning Code 2317 glass, respectively.

Corning Code 2318 alkali aluminosilicate glass comprises: about 61 mol % to about 75 mol % $SiO_2$; about 7 mol % to about 15 mol % $Al_2O_3$; 0 mol % to about 12 mol % $B_2O_3$; about 9 mol % to about 21 mol % $Na_2O$; 0 mol % to about 4 mol % $K_2O$; 0 mol % to about 7 mol % MgO; and 0 mol % to about 3 mol % CaO. In a further, more specific embodiment, Corning Code 2318 glass comprised (in mol %) 69.49% $SiO_2$, 8.45% $Al_2O_3$, 14.01% $Na_2O$, 1.16% $K_2O$, 0.185% $SnO_2$, 0.507% CaO, 6.2% MgO, 0.01% ZrO2, and 0.008% $Fe_2O_3$.

Corning Code 2317 alkali aluminosilicate glass comprises, consists essentially of, or consists of: about 60 mol % to about 70 mol % $SiO_2$; about 6 mol % to about 14 mol % $Al_2O_3$; 0 mol % to about 15 mol % $B_2O_3$; 0 mol % to about 15 mol % $Li_2O$; 0 mol % to about 20 mol % $Na_2O$; 0 mol % to about 10 mol % $K_2O$; 0 mol % to about 8 mol % MgO; 0 mol % to about 10 mol % CaO; 0 mol % to about 5 mol % $ZrO_2$; 0 mol % to about 1 mol % $SnO_2$; 0 mol % to about 1 mol % $CeO_2$; less than about 50 ppm $As_2O_3$; and less than about 50 ppm $Sb_2O_3$; wherein 12 mol %≤$Li_2O+Na_2O+K_2O$≤20 mol % and 0 mol %≤MgO+CaO≤10 mol %. In a further, more specific embodiment, Corning Code 2317 glass comprised (in mol %) 66.16% $SiO_2$, 10.29% $Al_2O_3$, 14.0% $Na_2O$, 2.45% $K_2O$, 0.6 $B_2O_3$, 0.21% $SnO_2$, 0.58% CaO, 5.7% MgO, 0.0105% ZrO2, and 0.0081% $Fe_2O_3$.

The ball drop tests are conducted utilizing the standardized ball drop test procedure described above. A stainless steel ball is dropped on square (50 mm×50 mm) glass sheet samples from increasing heights until impact failure of the samples occurs. All samples tested are subjected to the same conventional ion-exchange tempering treatment prior to testing, while selected ones of the samples are also treated by etching of the tempered surface with an aqueous solution consisting of 5 vol. % HF (48%) and 5 vol. % $H_2SO_4$ (98%) in water prior to ball drop testing. The acid-etched or treated (T) samples are differentiated from the untreated (NT) samples by bar pattern as shown in the Key for each drawing. All acid etching treatments are for a treatment interval which is effective to allow the above-described etching solution to remove a layer of glass not exceeding about 2 μm in thickness from the surface of the Corning Code 2318 and Corning Code 2317 glass sheets.

The ball drop heights (failure heights) reached at impact failure for each one of a numbered set of two samples (a treated (T) sample and a companion untreated (NT) sample) are shown by the bar heights in cm on the vertical axis of each graph, except for the 180 cm bar heights which, with one exception in FIG. 2, indicate survival rather than failure at that ball drop height. The sample sets are numbered on the horizontal axis of the graph, those sets being arbitrarily arranged in order of increasing treated sample failure height. Samples surviving ball drops of 180 cm. are not tested at higher ball drop heights in this series of tests.

FIG. 1 of the drawings shows representative ball drop test results for Corning Code 2318 glass sheet samples of 0.7 mm thickness, while FIG. 2 of the drawings shows representative ball drop test results for Corning Code 2317 glass sheet samples of 1.3 mm thickness. The substantial increases in the impact damage resistances of the treated sheets over those of untreated sheets are evident for both glasses and at both sheet thicknesses, even in cases where the untreated sheets exhibit relatively low impact damage resistance.

The improvements in ball drop performance secured through the use of the disclosed methods suggest that adequate resistance to impact damage for display cover glass use should be provided even in samples failing at the lower end of the ball drop height range. However, further evaluations of strengthened sheet performance utilizing bi-axial flexural strength testing methods indicate that, although average flexural strength levels are increased, individual sheet strengths remain undesirably variable. Thus some sheets have flexural strength values sufficiently low to present an unacceptable risk of cover sheet failure in later use.

Figure 3:
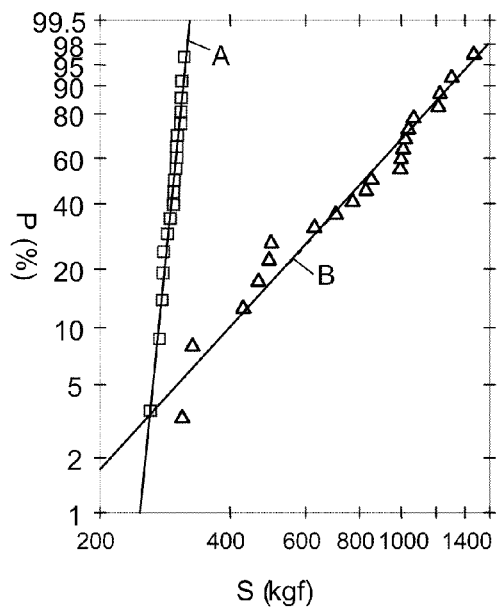
FIG. 3 is a graph presenting standardized bi-axial flexural strength data for two groups of glass sheet samples.

FIG. 3 of the drawings presents bi-axial flexural strength test results for two series of thin glass sheet samples. The data are representative of results from the testing of glass sheet samples of aluminosilicate glass composition and 1.0 mm sheet thickness. The strengths tests comprise subjecting each sample to ring-on-ring flexural stress to the point of breakage in apparatus that supports the bottom surface of each sample on a ring of 1-inch diameter while applying bi-axial flexural stress to the top surface using a ring of 0.5-inch diameter centered on the bottom ring. The horizontal axis of graph of FIG. 3 indicates the failure loads S applied at the point of breakage for each of the samples, in kilograms of force (kgf), while the vertical axis indicates the percent failure probability P (%) for the samples in each of the two groups.

The results for the two series fall along two different best-fit trend line curves, designated A and B in the drawing. The data on curve A are for ion-exchange-strengthened glass samples not subjected to supplemental surface treatments, while the data on curve B are for ion-exchange-strengthened samples subjected to a supplemental acid-etch strengthening treatment in accordance with the present disclosure.

The data in FIG. 3 demonstrate that substantial increases in mean flexural strength can be achieved through the acid-etch strengthening of the samples in accordance with the presently disclosed methods. Thus for glass sheet of the selected composition and thickness, a mean failure load exceeding 840 kgf is measured for the acid-etched samples (B), whereas mean failure loads of 294 kgf is measured for samples (A). However, curve B also suggests that a significant probability of failure (e.g. greater than 5%) remains at failure loads below 400 kgf for the acid-etched samples. Thus the combination of glass sheet tempering and supplemental acid-etch strengthening does not in all cases yield the consistently high flexural strengths needed for commercial use in advanced information display devices.

Failure analyses conducted to identify fracture origins in the above-reported low flexural strength samples point to relatively deep residual surface flaws as the sources of breakage. Likely introduced in the course of sheet manufacture, these flaws cannot be effectively neutralized by the limited surface etching that can be tolerated in chemically tempered glass sheet intended for use in electronic information displays.

The conclusion based on these analyses is that the flexural strengths of thin tempered and acid-etched glass sheet are significantly influenced by the surface quality of the starting glass sheet as a whole, particularly including the size and spatial distribution of any surface flaws present on the sheet prior to treatment. This source of sheet failure is not readily apparent from ball drop impact testing because the sheet surface areas stressed under ball drop impacts are much smaller than those stressed during bi-axial or four-point bend testing.

Figure 4:
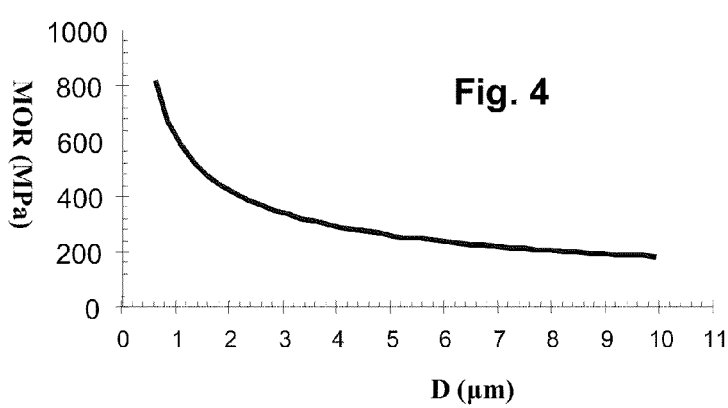
FIG. 4 is a graph plotting glass flexural strength against flaw depth for glass samples having flawed surfaces.

FIG. 4 of the drawings presents a curve showing the calculated effect of surface flaw depth on the modulus of rupture strength of untreated glass sheet as that strength would be measured by conventional four-point bending. Surface flaw depths D are indicated in micrometers (μm) on the horizontal drawing axis, while calculated modulus of rupture stresses (MOR) are indicated in megapascals (MPa) on the vertical drawing axis. As the breakage stress curve in FIG. 4 reveals, glass modulus of rupture strengths decrease rapidly with increasing flaw depths, with the largest reductions observed a flaw depths in the 0.5-3 μm depth range.

To insure consistently high strengths in thin glass sheet subjected to chemical tempering and acid etching in accordance with the presently disclosed methods, therefore, a preliminary step of selecting sheets for treatment that are substantially free of surface flaws of a depth greater than 2 μm prior to treatment is important. Such sheets can consistently provide high flexural strengths even where etching treatments designed to remove only minimum surface thicknesses from the tempered sheets are required.

The method by which glass sheet surfaces absent surface flaws of depths above 2 μm are provided is not critical. Strength screening, the use of mechanical pre-finishing (via grinding and polishing), or the use of sheet with fusion-formed surfaces that has been carefully protected from post-manufacturing handling damage, can each provide glass with the requisite freedom from large surface flaws. However, higher levels of strength enhancement are generally provided where the presently disclosed methods are applied to glass sheet with fusion drawn surfaces.

For video display cover sheet applications involving video displays with touch screen functionality and/or requiring minimum feasible cover glass thickness, both high retained (post-etching) compressive surface stress and a high retained depth of compression layer are required. Embodiments suitable for use in such applications comprise fusion-drawn glass sheets of alkali aluminosilicate composition not exceeding 1 mm in thickness, or in some embodiments not exceeding 0.7 mm in thickness or even 0.55 mm in thickness, treated after manufacture in accordance with the present disclosure. Satisfactorily strengthened glass cover sheets of the described composition and thickness for these applications retain a compressive surface layer of at least 30 um depth, or even 40 μm depth, after surface etching, with the surface layer providing a peak compressive stress level of at least 500 MPa, or even 650 MPa.

To provide thin alkali aluminosilicate glass cover sheets offering this combination of properties, sheet surface etching treatments of limited duration are required. In particular, the step of contacting a surface of the glass sheet with an etching medium is carried out for a period of time not exceeding that effective to remove 2 μm of surface glass, or in some embodiments not exceeding that effective to remove 1 μm of surface glass. The actual etching time required to limit glass removal in any particular case will depend on the composition and temperature of the etching medium as well as the composition of the solution and the glass being treated, but treatments effective to remove not more than 1 or 2 μm of glass from the surface of a selected glass sheet can readily be determined by routine experiment.

An alternative method for insuring that glass sheet strengths and surface compression layer depths are adequate for thin cover or touch screen applications involves tracking reductions in surface compressive stress level as etching proceeds. Etching time is then limited to limit the reductions in surface compressive stress necessarily caused by the etching treatment. Thus in some embodiments the step of contacting a surface of a strengthened alkali aluminosilicate glass sheet with an etching medium is carried out for a time not exceeding a time effective to reduce the compressive stress level in the glass sheet surface by 3%. Again the period of time suitable for achieving that result will depend on the composition and temperature of the etching medium as well as the composition of the glass sheet, but can readily be determined by routine experiment.

As noted above, the particular etching procedure used to treat the surface of a tempered glass sheet is not critical, but will depend on the particular etching medium employed as well as the particular requirements of the cover glass application. Where strengthening can be limited to only a rear surface of a video display cover sheet, i.e., the sheet surface to be positioned against or proximate to display surface of a selected video display device, the etching medium may conveniently be applied by rolling, brushing, spraying or the like. On the other hand, where both sides of the glass cover sheet are to be treated, dipping may constitute the most economic procedure.

Strengthened glass cover sheets exhibiting especially demanding combinations of strength and optical properties such as haze, surface gloss and glare suppression may be required where the cover glass is to be incorporated into devices designed for high definition video displays. Producing cover glass for these advanced applications places further constraints on the strengthening procedures that can be employed.

Embodiments of the disclosed methods useful for strengthening glass cover sheets for high definition video applications generally comprise the steps of selecting a glass sheet of alkali aluminosilicate composition having sheet thickness not exceeding about 1.0 mm, and then contacting at least one surface of the glass sheet with an ion-exchange strengthening medium comprising a source of alkali metal ions of larger ionic diameter than at least one alkali metal ion component present in the glass. The step of contacting the surface with the ion-exchange strengthening medium is carried out (i) at a temperature below the strain point of the glass, and (ii) for a time at least sufficient to develop a compressive stress layer with a depth in excess of 40 μm and a peak compressive stress level in excess of 650 MPa.

Following ion-exchange strengthening, the at least one surface of the glass sheet is contacted with an etching medium comprising an acidic solution containing a fluoride compound. In accordance with particular embodiments, the step of contacting with the etching medium is carried out for a time and at a temperature such that (i) not more than a 2 μm thickness of surface glass is removed from the sheet surface; (ii) a compressive stress of at least 650 MPa glass is retained in the sheet surface; (iii) the glass sheet retains final light transmission and surface gloss levels that differ by less than 1%, respectively, from the initial light transmission and surface gloss levels for the sheet, and (iv) the glass sheet retains a final haze level not exceeding 0.1%.

Table 1 below sets forth optical data collected on thin alkali aluminosilicate glass sheet samples, those samples including some with non-etched surfaces and some with surfaces etched with an acidic fluoride solution as above described to remove small amounts of surface glass from the sheets. The Type A samples in Table 1 are glass sheet samples having surfaces finished by grinding and polishing prior to treatment, while the Type B samples are drawn sheet samples of the same size and shape having unmodified or as-drawn surfaces.

TABLE 1

Glass Sheet Optical Properties

| Sample Type | Transmission (%) | Haze (ASTM D1003) | Gloss (ASTM D523) |
|---|---|---|---|
| A, no etch | 92 | 0.05 | 155 |
| A, no etch | 92 | 0.05 | 155.5 |
| A, no etch | 92 | 0.05 | 155 |
| A, no etch | 92 | 0.05 | 155.5 |
| A, etched surface | 92 | 0.06 | 155 |
| A, etched surface | 92 | 0.05 | 155 |
| A, etched surface | 92 | 0.05 | 156 |
| A, etched surface | 92 | 0.06 | 156 |
| B, no etch | 92 | 0.04 | 155 |
| B, no etch | 92 | 0.04 | 155 |
| B, no etch | 92 | 0.04 | 156 |
| B, etched surface | 92 | 0.04 | 156 |
| B, etched surface | 92 | 0.04 | 156 |
| B, etched surface | 92 | 0.04 | 156 |

The transmission data reported in Table 1 comprise values corresponding to the percent of visible light transmitted from a known source through both surfaces of the sheet samples. The haze values, determined in accordance with the method of ASTM D1003, are a measure of the percentage of light from a known source that is lost through wide angle scattering of the light during transmission through both surfaces of the sheet. The gloss values, determined in accordance with the method of ASTM D523, are a combined total of light reflection from both surfaces of each sheet, totaling more than 100% for these particular samples. The effectiveness of the disclosed surface etching treatments for improving sample strength without significantly affecting the optical properties of the glass sheets is evident from the data in Table 1.

Embodiments of the disclosed strengthening methods that can produce sheet glass meeting the required strength properties offer particular advantages for the processing of thin alkali aluminosilicate glass sheet incorporating an anti-glare surface layer on at least one surface of the sheet. The production of such sheet will typically comprise an additional step, prior to the step of contacting a surface of the glass with an ion-exchange strengthening medium, of treating at least one surface of the glass sheet to provide an anti-glare surface layer thereon. Steps for providing anti-glare surfaces that are compatible with the presently disclosed strengthening methods comprise any of the known methods that form an inorganic, alkali-ion-permeable, light-scattering surface or surface layer on the glass sheet. It is a particular advantage of the presently disclosed cover sheet strengthening methods that they may be employed to strengthen alkali aluminosilicate glass sheet incorporating such anti-glare surfaces without unacceptably modifying the anti-glare characteristics of those surfaces.

Further embodiments of the disclosed methods include those wherein the glass sheet is pre-treated to reduce the population and/or size of surface flaws thereon prior to strengthening. Particular examples of such embodiments include those comprising an additional step, prior to the step of contacting at least one surface of the glass with an ion-exchange medium, of contacting at least one surface of the glass with an etching medium to remove surface glass therefrom. Suitable etching media for such pre-treatments include the same fluoride-containing solutions useful for removing thin surface layers from glass sheets following the ion-exchange treatments.

Figure 5:
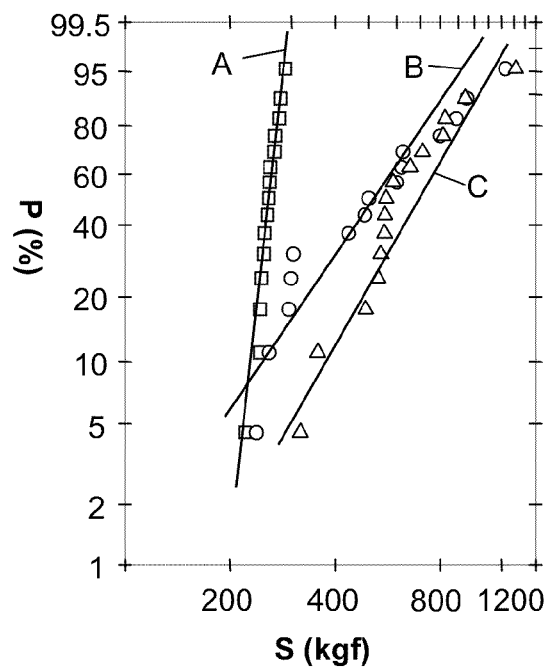
FIG. 5 is a graph presenting standardized bi-axial flexural strength data for three groups of strengthened glass sheet samples.

FIG. 5 of the drawings presents bi-axial flexural strength test results for three series of thin glass sheet samples subjected to different combinations of ion-exchange and surface etching treatments. The data are representative of results from the testing of glass sheet samples of aluminosilicate glass composition and 1.0 mm sheet thickness. The strength tests comprise subjecting each sample to ring-on-ring flexural stress following the procedure employed to generate the data presented in FIG. 3 above. The horizontal axis of graph of FIG. 6 indicates the flexural stress loads S applied at the point of breakage for each of the samples, in kilograms of force (kgf), while the vertical axis indicates the percent failure probability P (%) for the samples in each of the three groups.

The results for the three series of samples fall generally along three different trend lines, designated A, B and C in the drawing. The data represented by square data points and generally indicated by trend line A (the A samples) are for ion-exchange-strengthened glass samples not subjected to preliminary or supplemental surface etching treatments with a fluoride solution, while the data represented by circular data points indicated by line B (the B samples) are for samples of the same composition and geometry subjected sequentially to ion-exchange strengthening and then surface etching with an acidic fluoride solution as disclosed above. Finally, the triangular data points indicated by trend line C (the C samples) are for sheet samples subjected sequentially to preliminary surface etching with an acidic fluoride solution, then ion-exchange strengthening as for the A and B samples, and finally to a second surface etching treatment with the acidic fluoride solution, that solution being the same solution used for treating the B samples.

As the data in FIG. 5 reflect, the C samples subjected to both preliminary and final etching exhibit flexural strengths at least equivalent to those of the B samples indicated by curve B, and with significantly higher strengths than those of the samples of either curves A and B in the minimum strength region of the graph. Thus the curve C samples exhibit a mean failure load at breakage of about 651 kgf, while the curve A and curve B samples exhibit mean failure loads of 258 kgf and 569 kgf, respectively.

A further benefit resulting from the step of subjecting thin aluminosilicate glass sheet to chemical etching following tempering is a substantial improvement in the resistance of the sheet to flexural breakage due to edge flaws present at sheet edges. Such flaws can be introduced, for example, during the process of sheet cutting.

Figure 6:
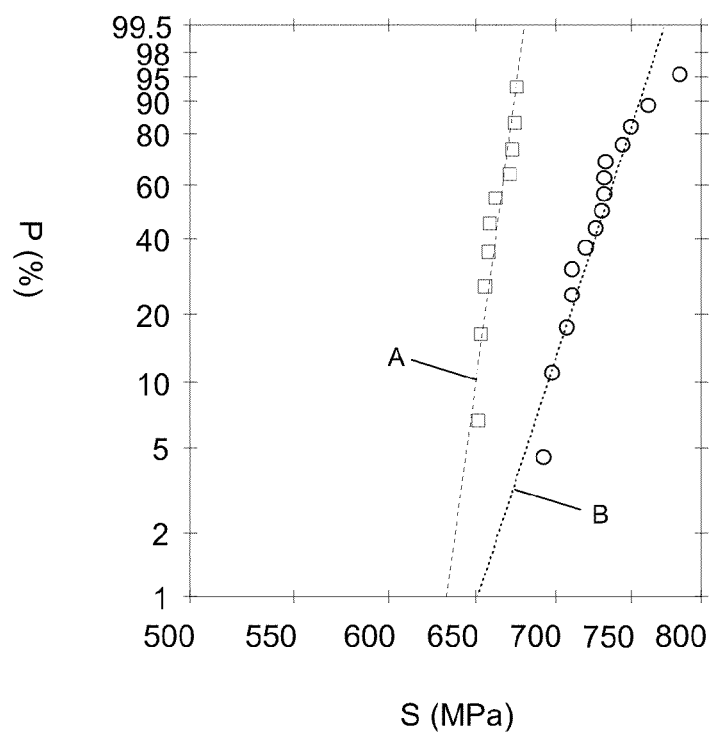
FIG. 6 is a graph presenting 4-point bending flexural strength data for two groups of strengthened glass sheet samples.

FIG. 6 of the drawings presents failure probability data for two groups of thin glass sheet samples subjected to 4-point bending stress to the point of breakage. In contrast to ball drop and ring-on-ring testing, which yield results indicative of glass sheet surface quality and strength, 4-point bending data are a measure of sheet edge strength, i.e., the weakening effects of any edge flaws present on a glass sheet sample.

The data plotted in FIG. 6 represent results from the bend-testing of thin sheet glass samples 44 mm by 60 mm in size. The data points indicated by trend line A in FIG. 6 are failure probability values P (indicated in percent on the vertical axis of the graph) for a group of tempered, non-etched samples, while the data points indicated by trend line B are values for a group of samples subjected to acid etching following tempering. Etching is carried out in an acidic fluoride solution of the composition and in the manner disclosed above. The stress level S applied at the point of failure for each of the samples is indicated in megapascals (MPa) on the horizontal axis of the graph.

The improvements in bending strength exhibited by the B (acid-etched) samples in FIG. 6 are evident from the data, with the A samples exhibiting a mean failure stress of about 663 MPa and the B samples exhibiting a mean failure stress of about 728 MPa. These improvements are achieved notwithstanding the fact that the amount of glass removed by the etching treatment is small (about 2 μm), while the edge flaws that limit sheet strength have depths in the 15-30 μm range.

Figure 7:
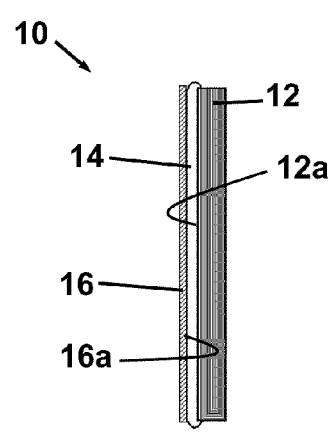
FIG. 7 is a schematic cross-section in side view of a video display device incorporating a strengthened glass cover sheet.

FIG. 7 of the drawings presents a schematic cross-sectional illustration of a video display device incorporating an impact-damage-resistant glass cover sheet in accordance with the present disclosure. As shown in a schematic side cross-sectional view in FIG. 7, video display device 10 comprises a video display 12 joined by an optional adhesive layer 14 to an impact-damage-resistant alkali aluminosilicate glass cover sheet 16. In the embodiment of FIG. 7, at least rear surface 16a of the cover sheet facing the active display surface 12a of the video display is an acid-etched surface incorporating a surface compression layer. In particular embodiments, rear surface 16a is under a surface compressive stress of at least 400 MPa and the surface compression layer has a depth of at least 15 μm.

Of course, the particular embodiments of glass products, video displays and glass treatment methods described herein are presented for purposes of illustration only, and without any intention to limit or restrict the design, use or practice of those products, methods or equivalents thereof to the extent falling within the scope of the appended claims.

What is claimed is:

1. An impact-damage-resistant glass sheet comprising at least one tempered and chemically-etched surface free of surface flaws of a depth greater than about 2 μm, said sheet exhibiting a standardized 128 g ball drop failure height of at least 120 cm and said tempered and chemically-etched surface incorporating a surface compression layer having a depth of at least 8 μm and a surface compressive stress level of at least 200 MPa, and at least one tempered and non-chemically-etched surface having a surface compression layer with a depth that is greater than the surface compression layer of the tempered and chemically-etched surface.

2. An impact-damage-resistant glass sheet in accordance with claim 1 wherein the glass sheet is a planar sheet of a uniform thickness not exceeding 2 mm, wherein the tempered and chemically-etched surface is an acid-etched surface, and wherein the surface compression layer of the tempered and chemically-etched surface has a depth of at least 15 μm and a surface compressive stress level of at least 400 MPa.

3. An impact-damage-resistant glass sheet in accordance with claim 2 wherein the glass sheet is composed of an alkali aluminosilicate glass and wherein the surface compression layer of the tempered and chemically-etched surface is an ion-exchanged surface layer having a layer depth of at least about 30 μm and a surface compressive stress level of at least about 500 MPa.

4. An impact-damage-resistant glass sheet in accordance with claim 3 having a thickness not exceeding 1 mm and an ion-exchanged surface layer having a layer depth of at least about 40 μm and a surface compressive stress level of at least about 650 MPa.

5. A video display cover sheet formed of alkali aluminosilicate glass, the sheet having a thickness not exceeding 1 mm, at least one tempered and chemically-etched surface defining a surface compression layer of at least 40 μm thickness, and a peak surface compressive stress level of at least about 650 MPa, wherein the sheet exhibits a standardized 128 g ball drop failure height of at least 120 cm, and the at least one tempered and chemically-etched surface is free of surface flaws of a depth greater than about 2 μm, and at least one tempered and non-chemically-etched surface having a surface compression layer with a depth that is greater than the surface compression layer of the tempered and chemically-etched surface.

6. A cover sheet in accordance with claim 5 having a thickness not exceeding 0.7 mm.

7. A video display device comprising an impact-damage-resistant glass cover sheet, wherein the glass cover sheet has (i) a thickness in the range of 0.2-2 mm, (ii) an alkali aluminosilicate glass composition, (iii) at least one surface compression layer incorporating a tempered and chemically-etched surface free of surface flaws of a depth greater than about 2 µm, and (iv) a standardized 128 g ball drop failure height of at least 120 cm, and at least one tempered and non-chemically-etched surface having a surface compression layer with a depth that is greater than a surface compression layer of the tempered and chemically-etched surface.

8. A display device in accordance with claim 7 wherein the glass cover sheet has a thickness not exceeding 1 mm, wherein the tempered and chemically-etched surface is an acid-etched surface, and wherein the surface compression layer incorporating the acid-etched surface has a depth of at least 30 µm and a surface stress level of at least 500 MPa.

9. An impact-damage-resistant glass sheet in accordance with claim 1, wherein the depth of the surface compression layer of the tempered and non-chemically-etched surface is greater than the depth of the surface compression layer of the tempered and chemically-etched surface by between about 1 µm and about 2 µm.

10. An impact-damage-resistant glass sheet in accordance with claim 1, wherein the impact-damage-resistant glass sheet has a bi-axial flexural strength test mean failure load of at least 651 kgf.

11. A cover sheet in accordance with claim 5, wherein the depth of the surface compression layer of the tempered and non-chemically-etched surface is greater than the depth of the surface compression layer of the tempered and chemically-etched surface by between about 1 µm and about 2 µm.

12. A cover sheet in accordance with claim 5, wherein the cover sheet has a bi-axial flexural strength test mean failure load of at least 651 kgf.

13. A display device in accordance with claim 7, wherein the depth of the surface compression layer of the non-chemically-etched surface is greater than the depth of the surface compression layer of the chemically-etched surface by between about 1 µm and about 2 µm.

14. A display device in accordance with claim 7, wherein the glass cover sheet has a bi-axial flexural strength test mean failure load of at least 651 kgf.

\* \* \* \* \*